United States Patent
So et al.

(10) Patent No.: US 7,941,101 B2
(45) Date of Patent: May 10, 2011

(54) APPARATUS AND METHOD OF REMOVING INTERFERENCE NOISE IN PERSONAL COMMUNICATION TERMINAL

(75) Inventors: Won Wook So, Gyunggi-do (KR); Hak Sun Kim, Daejeon (KR); Young Kyu Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 595 days.

(21) Appl. No.: 12/057,101

(22) Filed: Mar. 27, 2008

(65) Prior Publication Data

US 2008/0248774 A1    Oct. 9, 2008

(30) Foreign Application Priority Data

Apr. 3, 2007   (KR) .................. 10-2007-0032876

(51) Int. Cl.
*H04B 1/00*       (2006.01)
*H04B 17/00*     (2006.01)

(52) U.S. Cl. .................... 455/67.13; 455/63.1; 455/296; 455/556.1

(58) Field of Classification Search ............. 455/63.1, 455/67.11, 67.13, 296, 307, 344, 556.1, 556.2
See application file for complete search history.

(56) References Cited

U.S. PATENT DOCUMENTS

| | | | | |
|---|---|---|---|---|
| 5,826,181 A | * | 10/1998 | Reed | 455/296 |
| 5,974,101 A | * | 10/1999 | Nago | 455/307 |
| 7,460,846 B2 | * | 12/2008 | Maalismaa et al. | 455/63.1 |
| 2006/0291598 A1 | | 12/2006 | Gebara et al. | |

FOREIGN PATENT DOCUMENTS

| | | |
|---|---|---|
| JP | 11055147 A | 2/1999 |
| JP | 2001077714 A | 3/2001 |
| JP | 2004165941 A | 6/2004 |
| JP | 2006173698 A | 6/2006 |

OTHER PUBLICATIONS

Japanese Office Action for patent application No. 2008-078082, issued Jan. 13, 2011.

* cited by examiner

*Primary Examiner* — Quochien B Vuong
(74) *Attorney, Agent, or Firm* — Lowe Hauptman Ham & Berner LLP (57) ABSTRACT

Apparatus and method for removing interference noise in a personal communication terminal. A function of removing interference noise is adapted to the personal communication terminal, and adjustment parameters for removing interference noises are continuously set to up-to-date adjustment parameters, so that, in the activation of broadcast receiving, a turn-on stabilizing time of the personal communication terminal can be reduced, and the broadcast receiving performance can be maintained at an optimum state.

17 Claims, 9 Drawing Sheets

APPARATUS AND METHOD OF REMOVING INTERFERENCE NOISE IN PERSONAL COMMUNICATION TERMINAL

CROSS-REFERENCE TO RELATED APPLICATIONS

This application claims the priority of Korean Patent Application No. 2007-32876, filed on Apr. 3, 2007, in the Korean Intellectual Property Office, the disclosure of which is incorporated herein by reference.

BACKGROUND OF THE INVENTION

1. Field of the Invention

The present invention relates to an apparatus for removing interference noise, adapted to a personal communication terminal having functions such as broadcast receiving and communication, and more particularly, to apparatus and method for removing interference noise in a personal communication terminal, wherein a function of removing interference noise is adapted to the personal communication terminal, and adjustment parameters for removing interference noises are continuously set to up-to-date adjustment parameters, so that, in the activation of broadcast receiving, a turn-on stabilizing time of the personal communication terminal can be reduced, and the broadcast receiving performance can be maintained at an optimum state.

2. Description of the Related Art

In general, as the public interests have recently focused upon a TV digital broadcasting, technical developments have continuously occurred to a Korean digital multimedia broadcasting (DMB) and a European digital video broadcasting (DVB).

The DMB includes a terrestrial DMB and a satellite DMB, and the DVB includes a DVB-T that allows a fixed home or office appliance to receive a broadcasting signal from a general broadcasting station, and a DVB-H that is used for a mobile phone or a mobile video appliance in consideration of low-power, mobility and portability.

With the trend of providing multi-functions to a personal communication terminal, such as a mobile phone or a personal digital assistant (PDA), so-called a TV phone, in which a TV broadcasting function is incorporated in a mobile phone, is being brought into the market of Korea, and a mobile phone incorporating a DVB-H function is ready to come forth in Europe.

Here, in the case where a single communication terminal supports two or more functions (GSM/GPRS & DVB-H), it needs a proper measure to cope with a phenomenon of reduction in receiving sensitivity of the respective appliances due to their mutual interference.

Figure 1:
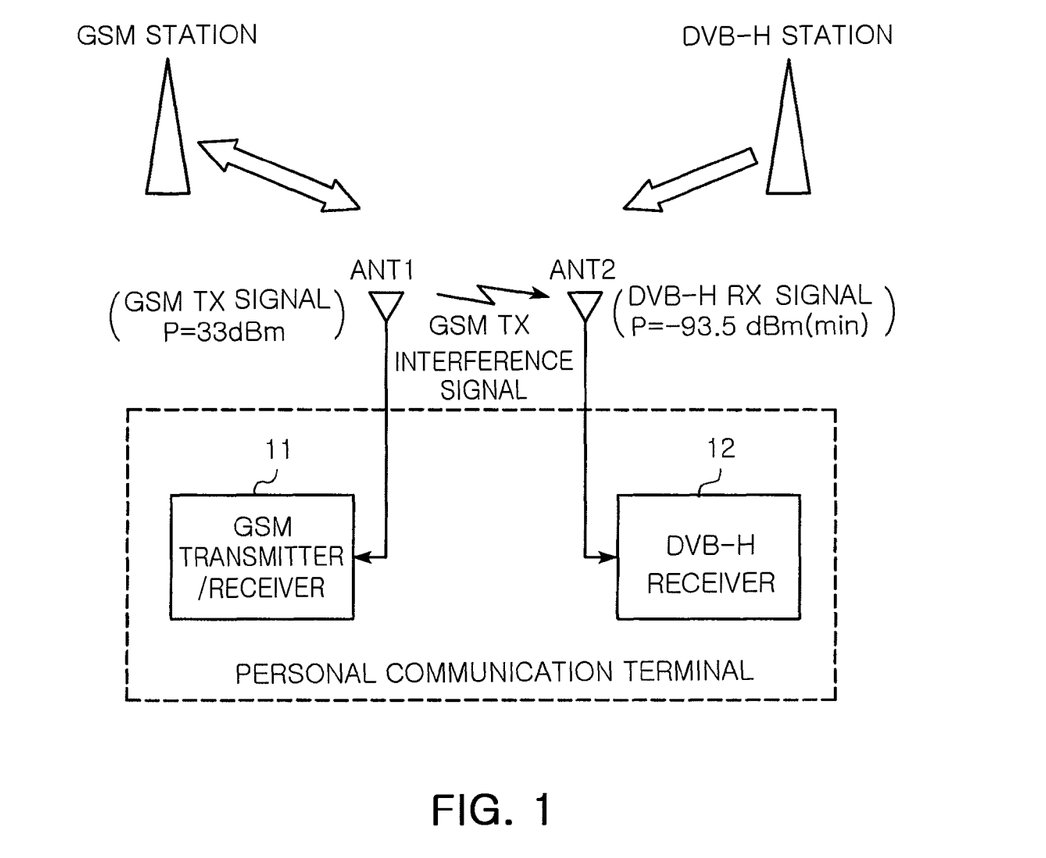
FIG. 1 is a constructional diagram illustrating a conventional personal communication terminal.

FIG. 1 is a constructional diagram of a conventional personal communication terminal. Referring to FIG. 1, the conventional personal communication terminal includes a GSM transmitter/receiver 11 for transmitting/receiving a GSM signal of approximately 900 MHz (TX: 880-915 MHz, RX: 925-960 MHz), and a DVB-H receiver 12 for receiving a DVB-H broadcasting signal having a band of approximately 470-750 MHz.

Such a conventional personal communication terminal, an influence on interference noise as that for a DVB-H receiving band corresponding to the phase noise of GSM900 transmitting band of approximately 900 MHz will be explained with reference to FIGS. 2A and 2B.

Figure 2A:
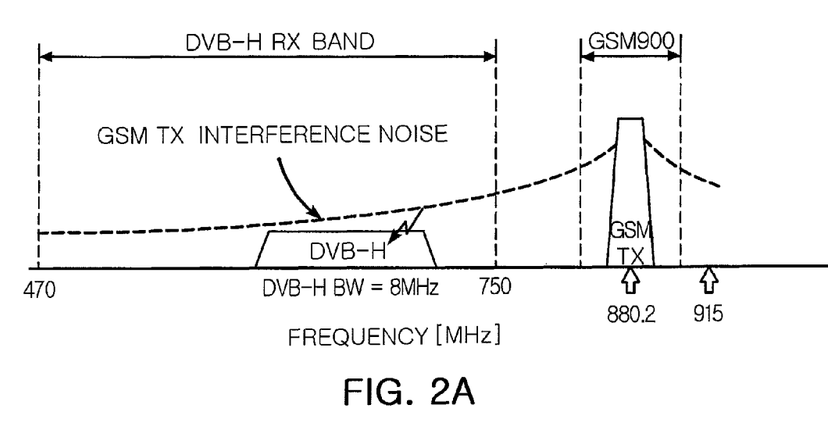
FIGS. 2A and 2B are views for explaining interference noise influence upon a receiving band and a transmitting band of the conventional personal communication terminal.
Figure 2B:
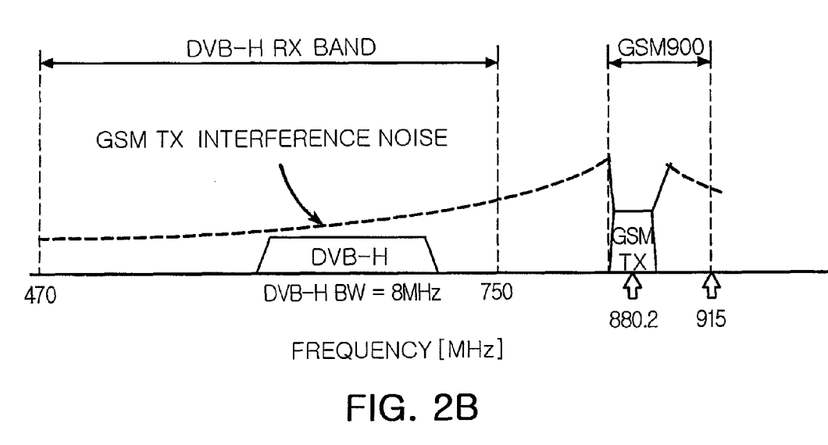

FIGS. 2A and 2B show an influence upon interference noise of the conventional personal communication terminal according to a receiving band and a transmitting band thereof. Particularly, FIG. 2A shows an influence upon interference noise of GSM900 transmitting band for DVB-H receiving band in the case where the DVB-H receiver 12 does not include, at its input, a band-pass filter for removing the GSM900 transmitting band, and FIG. 2B shows an influence upon interference noise of GSM900 transmitting band for DVB-H receiving band in the case where the DVB-H receiver 12 includes, at its input, a band-pass filter for removing the GSM900 transmitting band.

Referring to FIG. 2A, the DVB-H band ranges between approximately 470 MHz and 750 MHz, and the GSM900 transmitting band ranges between approximately 880 MHz and 915 MHz. In FIGS. 2A and 2B, it is shown that the interference noise signal of the GSM transmitting signal is introduced into the DVB-H receiving band, exerting a bad influence upon the DVB-H receiving signal.

Meanwhile, in the conventional personal communication terminal, during receiving a digital broadcasting via the DVB-H receiver 12, the situation of carrying out the GSM transmitting/receiving may occur via the GSM transmitter/receiver 11. In addition, during receiving a digital broadcasting via the DVB-H receiver 12, the situation of carrying out the GSM transmitting/receiving may also occur via other GSM transmitter/receiver positioned close thereto.

Referring to FIG. 2B, since the GSM transmitter/receiver 11 amplifies electric power of the GSM transmitting signal to high electric power of approximately +33 dBm via an internal power amplifier, such a high power GSM transmitting signal can be introduced into the DVB-H receiver 12 via an antenna. In this case, the GSM transmitting signal serves as noise in the receiving signal of the DVB-H broadcasting, so that in order to reduce such a noise, a band-pass filter (BPF) can be included in the input of the DVB-H receiver 12. The band-pass filter passes the DVB-H receiving signal of approximately 470-750 MHz, and filters the GSM transmitting signal of 880 MHz or more.

The band-pass filter included in the DVB-H receiver 12 of the conventional GSM mobile phone blocks the GSM transmitting signal, thereby improving a noise influence by an intermodulation between the GSM transmitting signal and the DVB-T signal, which occurs in an RF circuit of the DVB-H receiver 12.

However, in such a conventional GSM mobile phone, although it includes the band-pass filter, interference noise component of the GSM transmitting signal having a band of 470-750 MHz, which corresponds to a DVB-H receiving band, is not filtered by, but passes through the band-pass filter (BPF) without attenuation. This influences the DVB-H receiving band, thereby deteriorating the receiving sensitivity of the DVB-H broadcasting.

SUMMARY OF THE INVENTION

An aspect of the present invention provides an apparatus and method for removing interference noise in a personal communication terminal, wherein a function of removing interference noise is adapted to the personal communication terminal, and adjustment parameters for removing interference noises are continuously set to up-to-date adjustment parameters, so that, in the activation of broadcast receiving, a turn-on stabilizing time of the personal communication terminal can be reduced, and the broadcast receiving performance can be maintained at an optimum state.

According to an aspect of the present invention, there is provided an apparatus for removing interference noise in a personal communication terminal, the apparatus includes: a communication unit transmitting/receiving a first radio frequency signal via a first antenna; a broadcasting receiver unit receiving a second radio frequency signal via a second antenna and detecting a signal error rate from the second radio frequency signal; a signal coupler extracting the first radio frequency signal in low power from the first radio frequency signal outputted from the communication unit; a phase inversion unit phase-inverting an interference noise signal of the first radio frequency signal in low power extracted from the signal coupler; a memory unit including an adjustment table having up-to-date adjustment parameters to be set for removing the interference noise signal of the first radio frequency signal; a control unit, upon start of operation, setting the adjustment parameters of the memory unit to the phase inversion unit, changing the adjustment parameters based on the signal error rate from the broadcasting receiver unit, and re-setting the changed adjustment parameters to the phase inversion unit; and a signal combiner combining the inverted interference noise signal, from the phase inversion unit, with the second radio frequency signal, from the second antenna, thereby removing the interference noise signal of the first radio frequency signal included in the second radio frequency signal.

The control unit may update the adjustment parameters of the memory unit to adjustment parameters changed for use in next power-on.

The phase inversion unit may include a filter allowing the interference noise signal of the first RF signal in low power, extracted from the signal coupler, to pass therethrough; a phase inverter phase-inverting the interference noise signal in low power from the filter; and an amplifier amplifying the interference noise signal in low power inverted from the phase inverter.

The memory unit may store therein the adjustment parameters according to broadcasting channels of the broadcasting receiver unit.

The control unit may read out, from the memory unit, the adjustment parameters corresponding to the broadcasting channel selected by the broadcasting receiver unit and set the same to the phase inversion unit, and change the adjustment parameters according to the signal error rate corresponding to the selected channel of the broadcasting receiver unit and re-set the same to the phase inversion unit.

The memory unit may be made into a single module together with the phase inversion unit and the control unit. Alternatively, the memory unit may be made into a single module together with the broadcasting receiver unit. Further, the memory unit may be made into a single module together with the communication unit.

The signal error rate may be a bit error rate of the second RF signal or a frame error rate of the second RF signal.

According to another aspect of the present invention, there is provided a method of removing interference noise in a personal communication terminal, which includes a communication unit, a broadcasting receiver unit, a phase inversion unit phase-inverting an interference noise signal extracted from a first radio frequency signal, transmitted from the communication unit, and coupling the phase-inverted signal to a second radio frequency signal input to the broadcasting receiver unit, thereby removing the interference noise signal of the first radio frequency signal included in the second radio frequency signal, and a memory unit storing therein adjustment parameters to be set for removing the interference noise signal of the first radio frequency signal. The method includes procedures of: determining whether the broadcasting receiver unit is powered-on or not; upon power-on of the broadcasting receiver unit, reading up-to-date adjustment parameters from the memory unit and setting the same to the phase inversion unit; measuring a signal error rate of a broadcasting channel selected by the broadcasting receiver unit; and changing the adjustment parameters based on the signal error rate and re-setting the changed adjustment parameters to the phase inversion unit.

The method may further include a procedure of storing the changed adjustment parameters in the memory unit and updating the adjustment parameters for the next use.

The procedure of reading up-to-date adjustment parameters from the memory unit and setting the same to the phase inversion unit is carried out such that, upon power-on of the broadcasting receiver unit, the up-to-date adjustment parameters corresponding to the broadcasting channel selected by the broadcasting receiver unit are read out from the memory unit and are set to the phase inversion unit.

The procedure of measuring a signal error rate of a broadcasting channel selected by the broadcasting receiver unit may be carried out such that the signal error rates are respectively measured for each broadcasting channel selected by the broadcasting receiver unit.

The procedure of re-setting the changed adjustment parameters to the phase inversion unit may be carried out such that the adjustment parameters are changed while being sorted by the respective broadcasting channels according to the respective signal error rates for each broadcasting channel, and are re-set to the phase inversion unit.

The procedure of updating the adjustment parameters for the next use may be carried out such that the changed adjustment parameters are stored in the memory unit while being sorted by the respective channels, and are updated for each channel.

The procedure of re-setting the changed adjustment parameters to the phase inversion unit may include procedures of: determining whether or not the present signal error rate measured is larger than a reference signal error rate, and if not, updating the adjustment parameters for the next use; if the present signal error rate is larger than the reference signal error rate, determining whether or not the present signal error rate is larger than the previous signal error rate; if the present signal error rate is not larger than the previous signal error rate, adjusting the phase of the phase inverter and the gain of the amplifier in the same direction as the previous adjusting direction; and if the present signal error rate is larger than the previous signal error rate, adjusting the phase of the phase inverter and the gain of the amplifier in opposite direction to the previous adjusting direction.

The signal error rate may be a bit error rate of the second RF signal or a frame error rate of the second RF signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

The present invention is not limited to the embodiments to be described, which are used for understanding technical spirits of the present invention. In the following description and drawings, the same reference numerals are used to designate the same or similar components.

Figure 3:
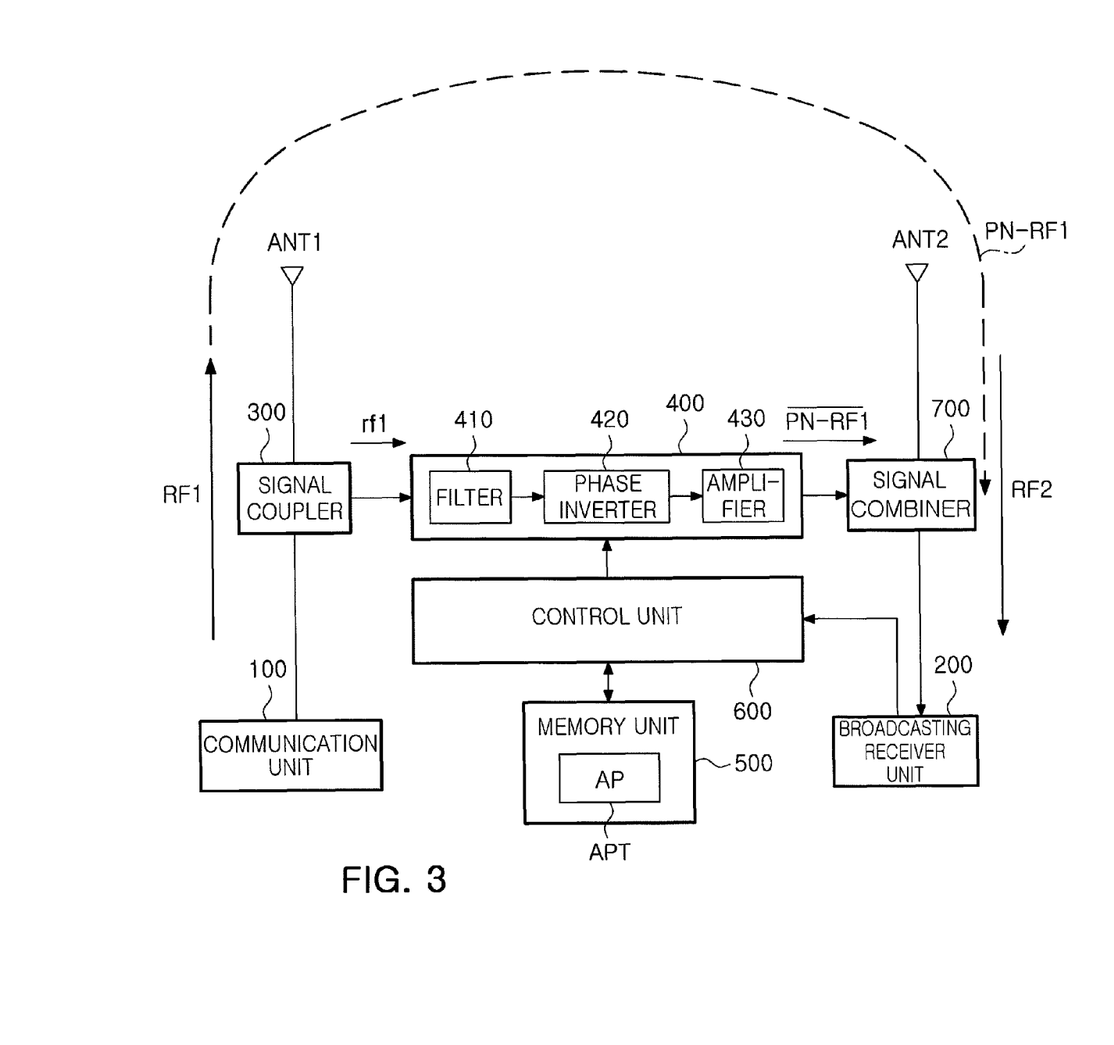
FIG. 3 is a constructional view illustrating an apparatus for removing interference noise in a personal communication terminal according to the present invention.

FIG. 3 is a constructional view illustrating an apparatus for removing interference noise in a personal communication terminal according to the present invention. Referring to FIG. 3, the interference noise removing apparatus includes a communication unit 100, a broadcasting receiver unit 200, a signal coupler 300, a phase inversion unit 400, a memory unit 500, a control unit 600, and a signal combiner 700.

The communication unit 100 transmits/receives a first RF signal (RF1) via a first antenna ANT1. Here, the communication unit 100 may adopt one communication mode selected from various phone communication modes so that it may be for example a GSM communication unit according to a GSM communication mode.

The broadcasting receiver unit 200 receives a second RF signal RF2 via a second antenna ANT2, and detects a signal error rate from the second RF signal. Here, the broadcasting receiver unit 200 may adopt one broadcasting mode selected from various digital television broadcasting modes. For example, the broadcasting receiver unit 200 may be implemented as a DVB-H broadcasting receiver unit according to a DVB-H broadcasting mode.

As set forth before, as an example, the personal communication terminal to which the interference noise removing apparatus of the present invention is adapted may be a GSM phone via which a user can look and listen a TV broadcasting.

In addition, the signal coupler 300 extracts a first RF signal rf1 in low power from the first RF signal RF1 output from the communication unit 100.

The phase inversion unit 400 inverts the phase of interference noise signal PN-RF1 of the low-power first RF signal rf1, extracted from the signal coupler 300. Like this, the phase inversion unit 400 inverts the phase of the interference noise signal PN-RF1 of the low-power first RF signal rf1 in order to remove the interference noise signal PN-RF1 of the first RF signal rf1 input via the second antenna ANT2.

The memory unit 500 includes an adjustment table APT having up-to-date adjustment parameters AP to be set in order to remove the interference noise signal of the first RF signal RF1.

The control unit 600 sets, upon operation starting, the adjustment parameters AP of the memory unit 500 to the phase inversion unit 400, changes the adjustment parameters AP based on the signal error rate SER from the broadcasting receiver unit 200, re-sets the changed adjustment parameters to the phase inversion unit 400, and updates the adjustment parameters of the memory unit for each channel to the changed adjustment parameters for use in the next power-on. Such a re-setting will be explained later.

The signal combiner 700 combines the inverted interference noise signal from the phase inversion unit 400 with the second RF signal RF2 from the second antenna ANT2, thereby removing the interference noise signal PN-RF1 of the first RF signal included in the second RF signal RF2.

Figure 4:
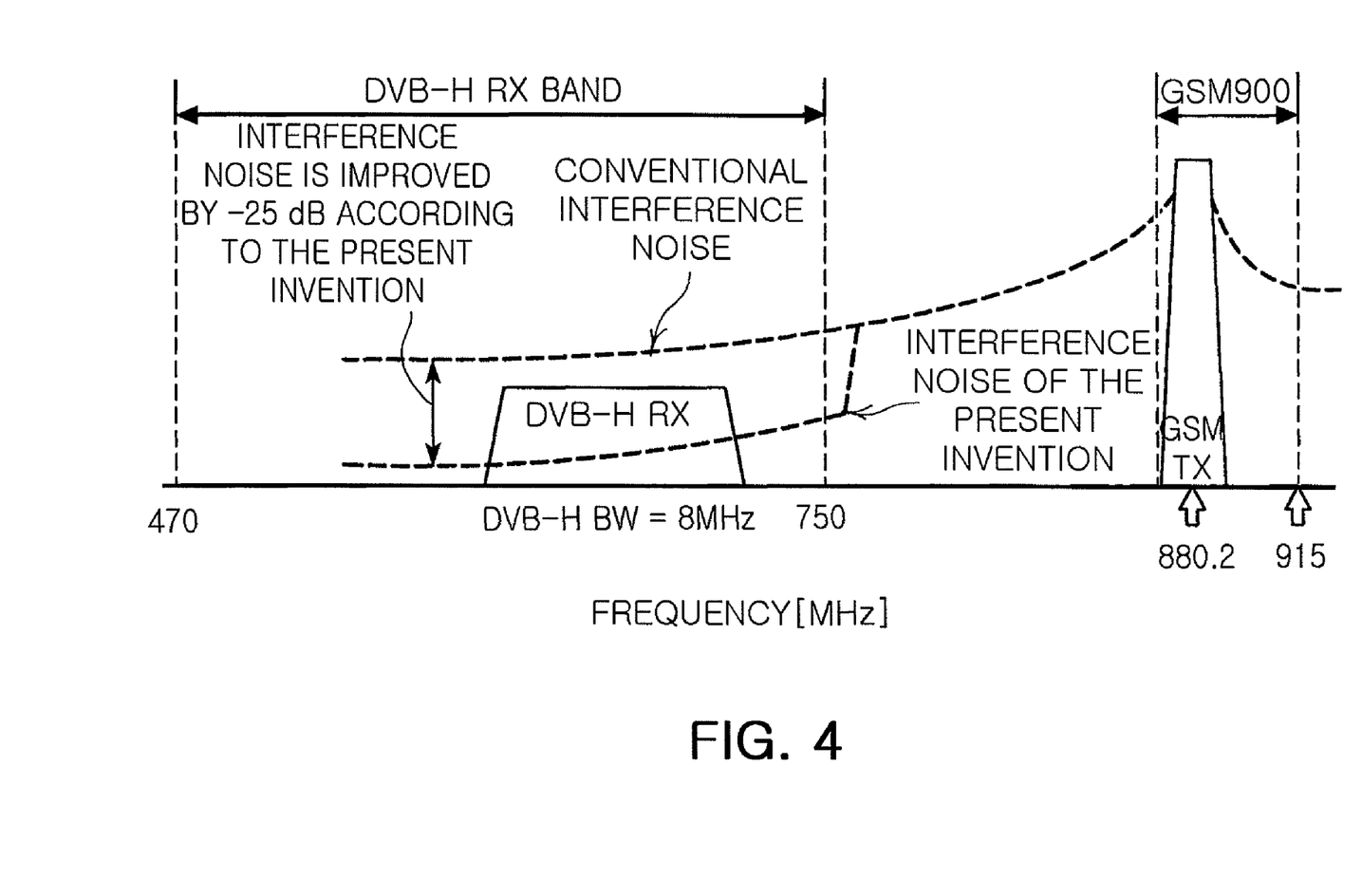
FIG. 4 is a view for explaining the removal of the interference noise by the interference noise removal apparatus of FIG. 3.

FIG. 4 is a view for explaining the removal of the interference noise by the interference noise removal apparatus of FIG. 3. That is, FIG. 4 explains the removing performance for the interference noise when the GSM900 communication terminal receives a DVB-H broadcasting in the case where the personal communication terminal is a GSM900 communication terminal.

In FIG. 4, GSM900 is a frequency band of a GSM transmitting signal, and DVB-H RX is a DVB-H receiving signal. FIG. 4 shows that a bad influence of the interference noise signal of the GSM transmitting signal upon the DVB-H receiving signal has been improved according to the present invention.

That is, the interference noise of the GSM transmitting signal was removed by about 25 dB so that the DVB-H receiving signal could be received more efficiently.

Referring to FIGS. 3 and 4, the phase inversion unit 400 includes a filter 410 allowing the interference noise signal pn-rf1 of the low-power first RF signal rf1, extracted from the signal coupler 300, to pass therethrough, a phase inverter 420 inverting the phase of the low-power interference noise signal pn-rf1 from the filter 410, and an amplifier 430 amplifying the low-power phase-inverted signal, inverted by the phase inverter 420.

Herein, the adjustment parameters may comprise a frequency parameter to be set to the filter 410 and the phase inverter 420, and a gain parameter to be applied to the amplifier 430.

The memory unit 500 stores, therein, the adjustment parameters AP according to the broadcasting channels of the broadcasting receiver unit 200, so that the adjustment parameters are updated with changed up-to-date adjustment parameters, and thus the optimum up-to-date adjustment parameters can be stored for the respective broadcasting channels.

Herein, the control unit 600 reads out, from the memory unit, the adjustment parameter AP corresponding to the broadcasting channel selected by the broadcasting receiver unit 200 and sets the same to the phase inversion unit 400, then upon operation, changes the adjustment parameter AP according to the signal error rate SER corresponding to the selected channel of the broadcasting receiver unit 200 and re-sets the changed to the phase inversion unit 400, and updates the adjustment parameters of the memory unit to the changed adjustment parameters for use in the next power-on.

Meanwhile, the memory unit is a memory, which the adjustment parameters can be read out from and be written into. The memory may be for example a flash memory, and may be embodied as illustrated in FIGS. 5 to 7 according to a memory location particularly specified.

Figure 5:
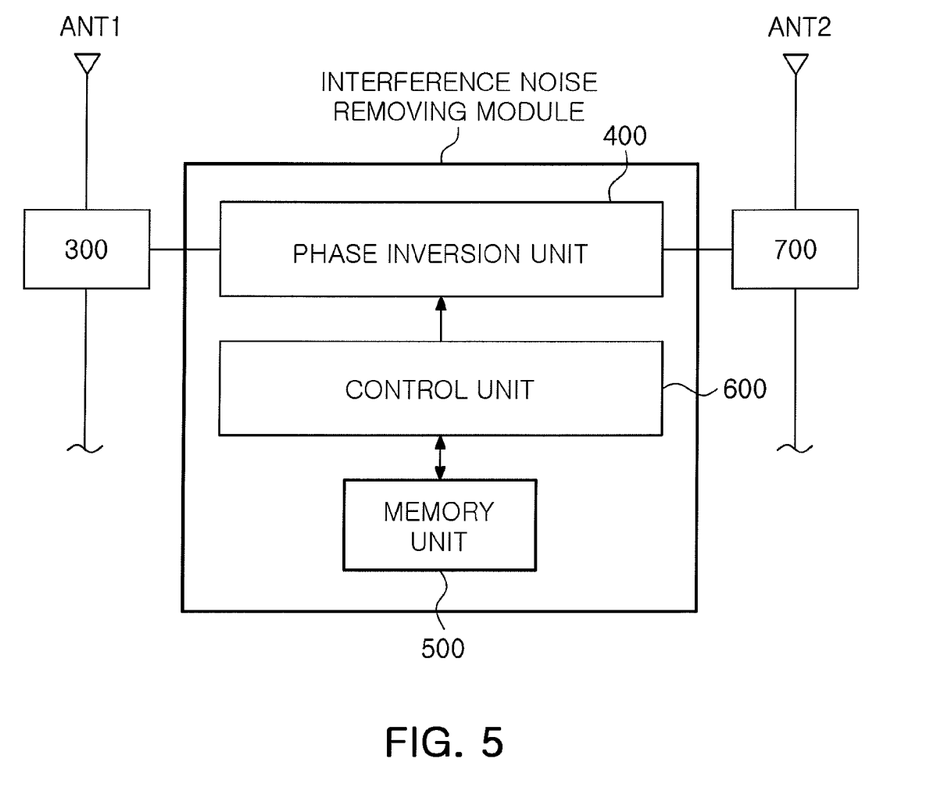
FIG. 5 is a view illustrating a first embodiment of a memory unit of FIG. 3.

FIG. 5 is a view illustrating a first embodiment of the memory unit of FIG. 3, wherein the memory unit 500 may be fabricated in a single module with the phase inversion unit 400 and the control unit 600. Here, the module including the phase inversion unit 400, the control unit 600 and the memory unit 500 may be called interference noise removing module.

Figure 6:
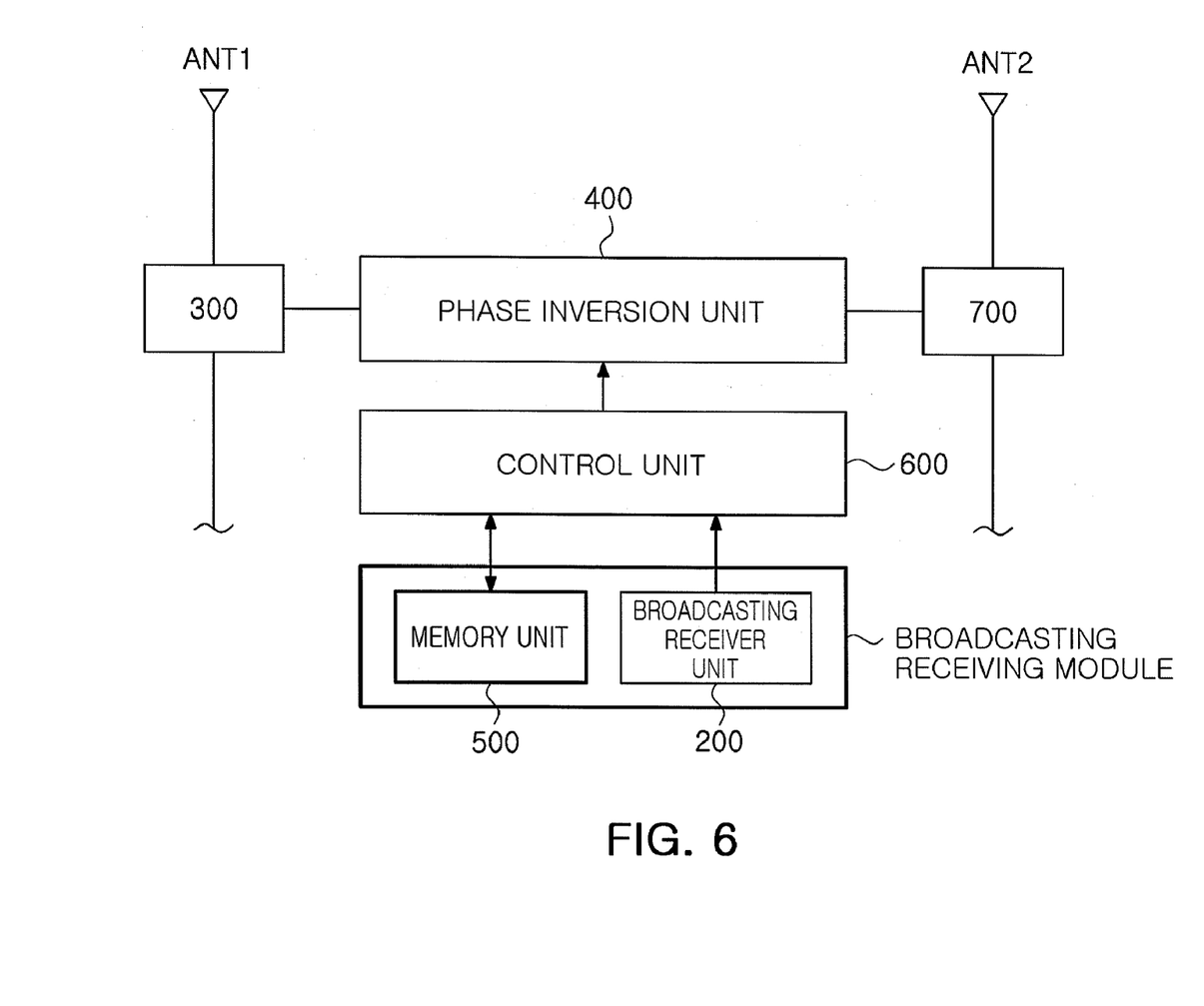
FIG. 6 is a view illustrating a second embodiment of a memory unit of FIG. 3.

FIG. 6 is a view illustrating a second embodiment of the memory unit of FIG. 3, wherein the memory unit 500 may be fabricated in a single module with the broadcasting receiver unit 200. Here, the module including the broadcasting receiver unit 200 and the memory unit 500 may be called a broadcasting receiving module.

Figure 7:
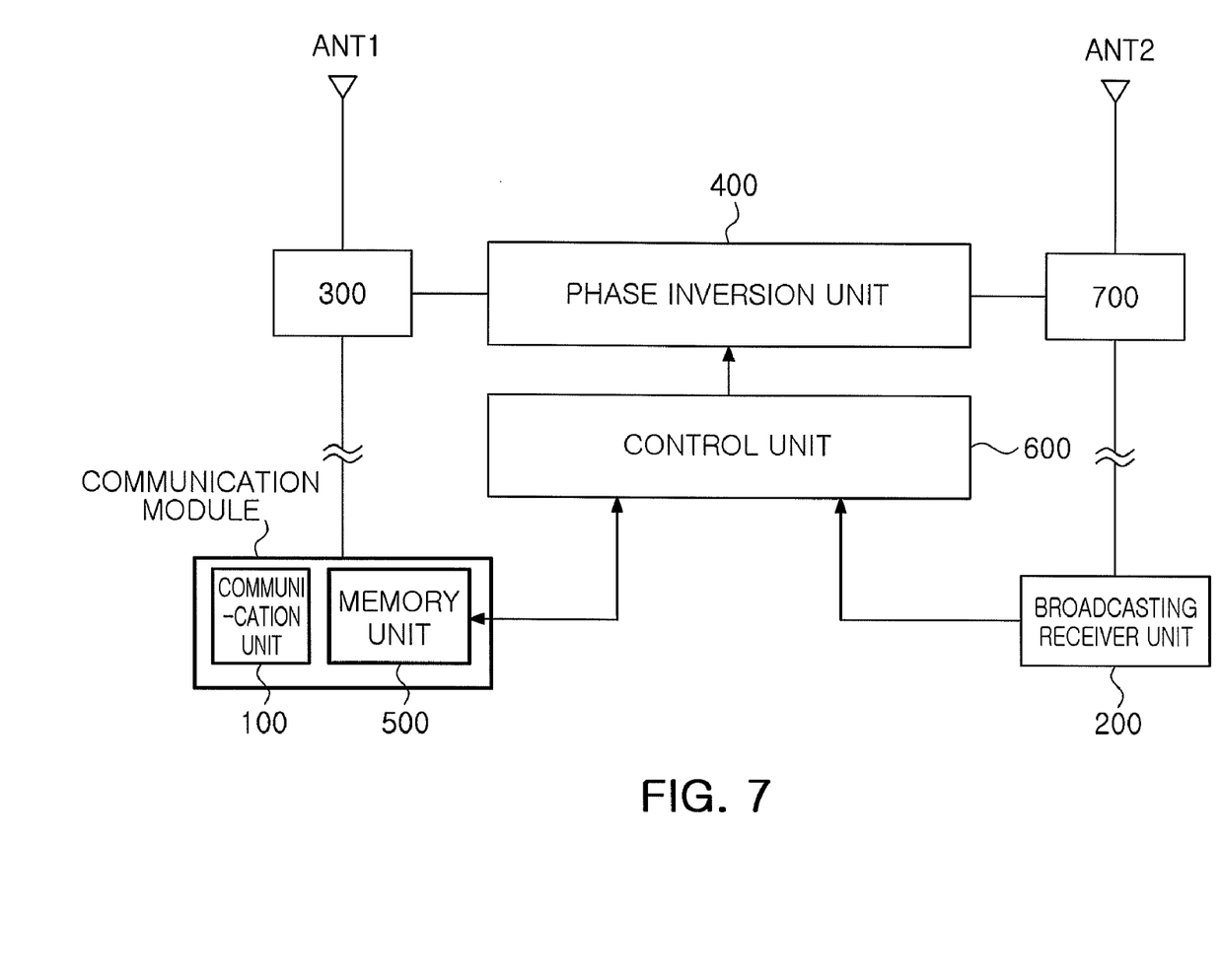
FIG. 7 is a view illustrating a third embodiment of a memory unit of FIG. 3.

FIG. 7 is a view illustrating a third embodiment of the memory unit of FIG. 3, wherein the memory unit 500 may be fabricated in a single module with the communication unit 100. Here, the module including the memory unit 500 and the communication unit 100 may be called a communication module.

Referring to FIGS. 3 to 5, the signal error rate SER can be determined by its adapting manner. For example, it may be a bit error rate (BER) of the second RF signal, or a frame error rate (FER) of the second RF signal.

Figure 8:
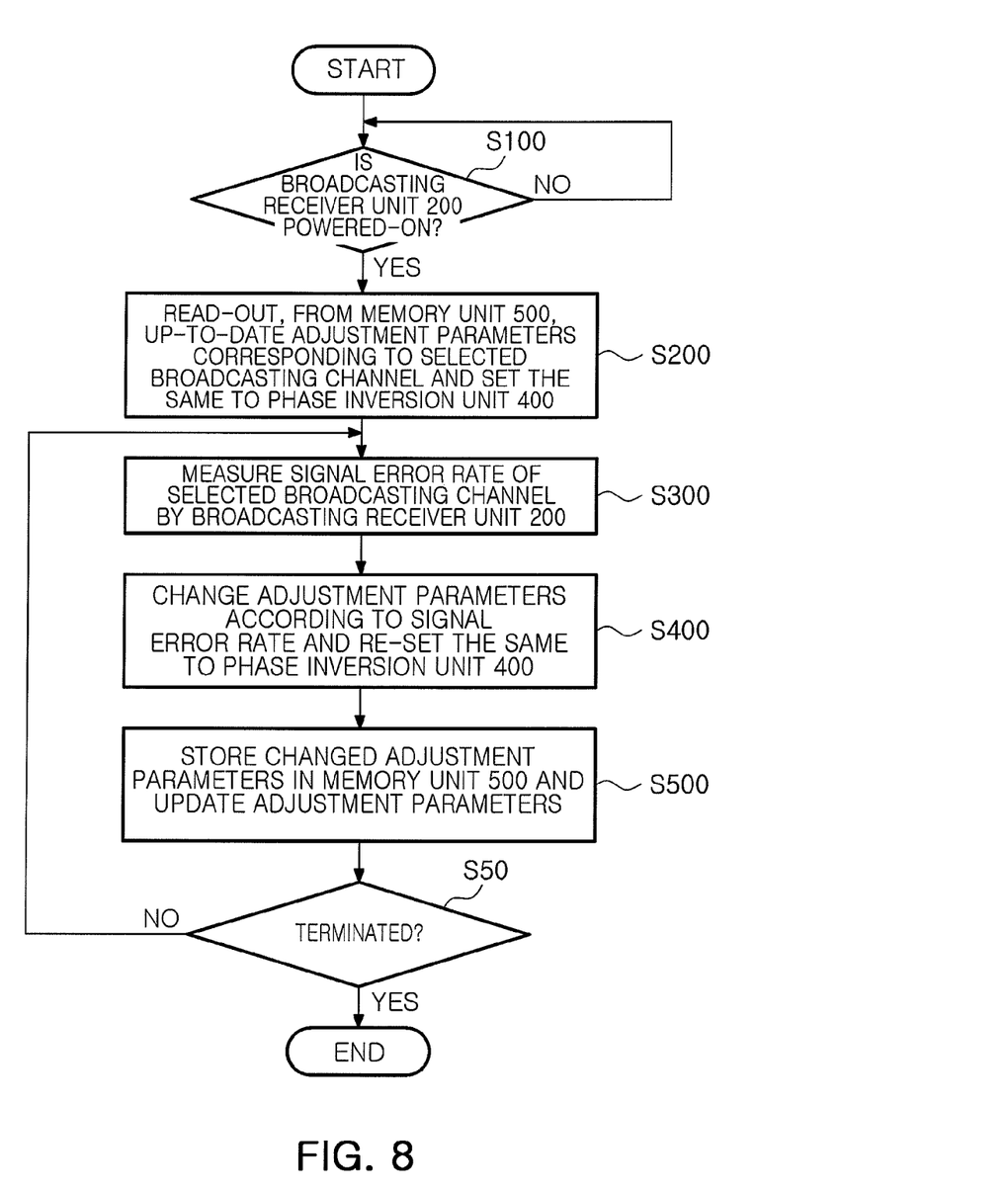
FIG. 8 is a flow chart illustrating a method of removing interference noise in a personal communication terminal according to the present invention.

FIG. 8 is a flow chart illustrating a method of removing interference noise in a personal communication terminal according to the present invention. Referring to FIGS. 3 to 8, the interference noise removing method comprises the steps of determining whether the broadcasting receiver unit 200 is powered-on or not (S100), upon power-on of the broadcasting receiver unit 200, reading up-to-date adjustment parameters from the memory unit 500 and setting the same to the phase inversion unit 400 (S200), measuring a signal error rate of a broadcasting channel selected by the broadcasting receiver unit 200 (S300), changing the adjustment parameters based on the signal error rate and re-setting the changed adjustment parameters to the phase inversion unit 400 (S400), and storing the changed adjustment parameters in the memory unit 500 and updating the adjustment parameters for the next use (S500).

Meanwhile, the memory unit 500 stores therein the adjustment parameters AP, that are to be set for removing the interference noise signal of the first RF signal RF1, while sorting the same for each broadcasting channel of the broadcasting receiver unit 200.

The setting step S200 is carried out such that, upon power-on of the broadcasting receiver unit 200, the up-to-date adjustment parameters corresponding to the broadcasting channel selected by the broadcasting receiver unit 200 are read out from the memory unit 500 and are set to the phase inversion unit 400.

The measuring step S300 is carried out such that the signal error rates are respectively measured for each broadcasting channel selected by the broadcasting receiver unit 200.

The re-setting step S400 is carried out such that the adjustment parameters are changed while being sorted by the respective broadcasting channels according to the respective signal error rates for each broadcasting channel, and are re-set to the phase inversion unit 400.

The updating step S500 is carried out such that the changed adjustment parameters are stored in the memory unit 500 while being sorted by the respective channels, and are updated for each channel.

Figure 9:
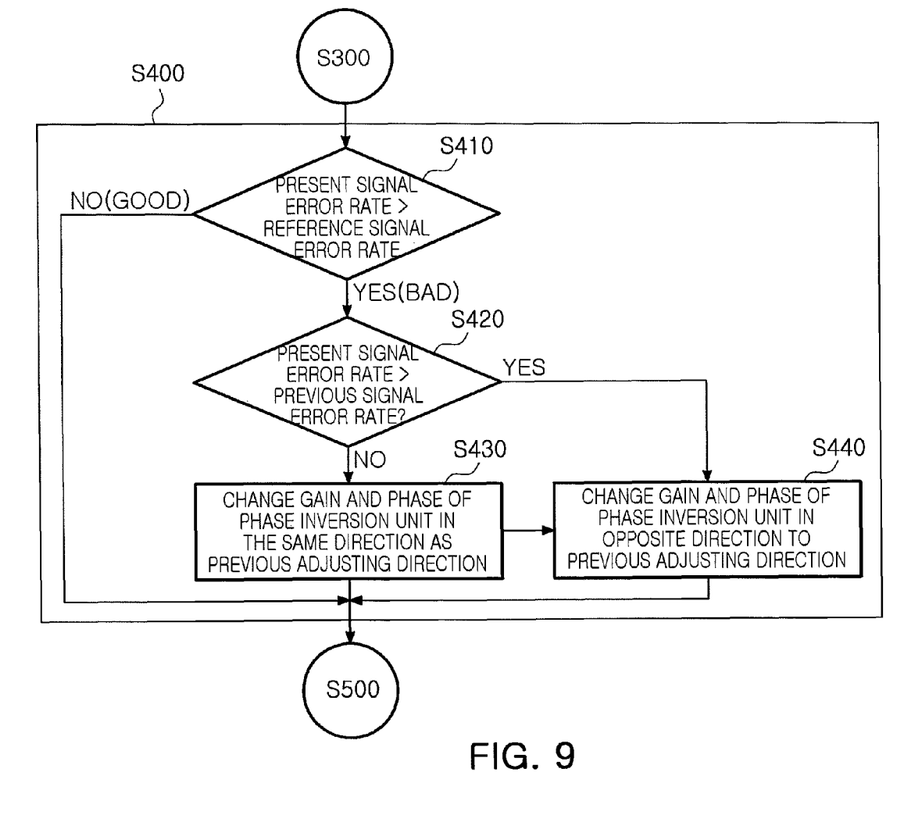
FIG. 9 is a detailed flow chart illustrating a procedure of the method of FIG. 8.

FIG. 9 is a detailed flow chart illustrating a procedure of the method of FIG. 8. Referring to FIGS. 3 to 9, the re-setting step S400 includes the steps of determining whether or not the present signal error rate measured is larger than a reference signal error rate, and if not, going to the updating step S500 (S410), if the present signal error rate is larger than the reference signal error rate, determining whether or not the present signal error rate is larger than the previous signal error rate (S420), if the present signal error rate is not larger than the previous signal error rate, adjusting the phase of the phase inverter and the gain of the amplifier in the same direction as the previous adjusting direction (S430), and if the present signal error rate is larger than the previous signal error rate, adjusting the phase of the phase inverter and the gain of the amplifier in opposite direction to the previous adjusting direction (S440).

Hereinafter, the operation and the effects of the present invention will now be described in detail with reference to accompanying drawings.

The apparatus and method of removing the interference noise in the personal communication terminal according to the present invention will be described referring to FIGS. 3 to 9, and the interference noise removing apparatus of the present invention will be first described referring to FIGS. 3 to 7.

In FIG. 3, during operation of the personal communication terminal to which the interference noise removing apparatus is adapted, the communication unit 100 can transmit/receive a first RF signal (RF1) via a first antenna ANT1. Here, the first RF signal RF1 may be an RF signal included in a GSM communication band.

Herein, upon turning-on a broadcasting function in the personal communication terminal, the broadcasting receiver unit 200 receives a second RF signal RF2 via a second antenna ANT2, and detects a signal error rate from the second RF signal. Here, the second RF signal RF2 may be an RF signal included in a DVB-H broadcasting band.

Here, the signal error rate may be a bit error rate (BER) of the second RF signal or a frame error rate (FER) of the second RF signal according to a communication mode of the personal communication terminal adapted.

The memory unit 500 includes an adjustment table APT having up-to-date adjustment parameters AP to be set for removing the interference noise signal of the first RF signal RF1.

The control unit 600 of the personal communication terminal sets, upon operation starting, the adjustment parameters AP of the memory unit 500 to the phase inversion unit 400 to thereby allow the phase inversion unit 400 to carry out an operation for removing the interference noise.

Thus, the signal coupler 300 extracts a first RF signal rf1 in low power from the first RF signal RF1 output from the communication unit 100. Here, the second RF signal RF2 input via the second antenna ANT2 may include the interference noise signal PN-RF1 by the first RF signal RF1.

The phase inversion unit 400 inverts the phase of interference noise signal PN-RF1 of the low-power first RF signal rf1 extracted from the signal coupler 300, and outputs the same to the signal combiner 700. The signal combiner 700 combines the inverted interference noise signal, from the phase inversion unit 400, with the second RF signal RF2, from the second antenna ANT2, thereby removing the interference noise signal PN-RF1 of the first RF signal included in the second RF signal RF2.

While carrying out such an operation, the control unit 600 changes the adjustment parameters AP based on the signal error rate SER from the broadcasting receiver unit 200, re-sets the changed adjustment parameters to the phase inversion unit 400, and updates the adjustment parameters of the memory unit for each channel to the changed adjustment parameters for use in the next power-on.

Herein, the update of the adjustment parameters can be set suitable to the situation of the system adapted, e.g., at predetermined time-intervals, at every change of the adjustment parameters, at every change of the broadcasting channel, or at power-off.

FIG. 4 explains the removing performance for the interference noise when a GSM900 communication terminal receives a DVB-H broadcasting in the case where the personal communication terminal is the GSM900 communication terminal. In FIG. 4, GSM900 is a frequency band of a GSM transmitting signal, and DVB-H RX is a DVB-H receiving signal. FIG. 4 shows that a bad influence of the interference noise signal of the GSM transmitting signal upon the DVB-H receiving signal has been improved according to the present invention. That is, the interference noise of the GSM transmitting signal was removed by about 25 dB so that the DVB-H receiving signal could be received more efficiently.

The phase inversion unit 400 will now be explained with reference to FIGS. 3 and 4.

Referring to FIGS. 3 and 4, in the case where the phase inversion unit 400 includes the filter 410, the phase inverter 420 and the amplifier 430, the filter 410 passes therethrough the interference noise signal pn-rf1 of the low-power first RF signal rf1 extracted from the signal coupler 300 to the phase inverter 420.

The phase inverter 420 inverts the phase of the low-power interference noise signal pn-rf1 from the filter 410, and outputs the same to the amplifier 430.

The amplifier 430 amplifies the low-power phase-inverted signal inverted from the phase inverter 420 and outputs the same to the signal combiner 700.

Herein, in order to improve the removal performance for the interference noise in the interference noise removing apparatus of the invention, the adjustment parameters may be managed with up-to-date parameters for each broadcasting channel.

That is, the memory unit 500 stores therein the adjustment parameters AP according to the broadcasting channels of the broadcasting receiver unit 200. To change the adjustment parameters, the memory unit 500 is a memory, which the adjustment parameters can be read out from and written into. The memory unit 500 updates the adjustment parameters, and in which the up-to-date adjustment parameters cannot be erased, but be still recorded even when the interference noise removing apparatus or the personal communication terminal is powered-off, which enables adaptation of up-to-date adjustment parameters upon the next power-on, providing faster normalization in operation.

Herein, the control unit 600 reads out, from the memory unit 500, the adjustment parameter AP corresponding to the broadcasting channel selected by the broadcasting receiver unit 200, and sets the same to the phase inversion unit 400.

Then, the control unit 600 changes the adjustment parameter AP according to the signal error rate SER corresponding to the selected channel of the broadcasting receiver unit 200 and re-sets the changed to the phase inversion unit 400.

The memory may be for example a flash memory, and may be embodied as illustrated in FIGS. 5 to 7, wherein the memory unit 500 is fabricated into a single module together with the phase inversion unit 400 and the control unit 600 (FIG. 5), together with the broadcasting receiver unit 200 (FIG. 6), and together with the communication unit 100 (FIG. 7).

Hereinafter, the interference noise removing method of the present invention will be explained with reference to FIGS. 3 to 9.

In the description on the interference noise removing method, the technical contents described in the interference noise removing apparatus will be adapted as it is, but the overlapped contents will be omitted as possible.

In FIG. 8, when the personal communication terminal to which the interference noise removing method of the present invention is adapted is in operation, as described before, the communication unit 100 of the communication terminal can transmit/receive the first RF signal RF1 via the first antenna ANT1. Here, the first RF signal RF1 may be an RF signal included in the GSM communication band.

In advance of description, the memory unit 500 stores therein the adjustment parameters AP to be set for removing the interference noise signal of the first RF signal RF1. Here, the memory unit 500 can store the adjustment parameters to be set for removing the interference noise signal of the first RF signal RF1 while sorting by the broadcasting channels of the broadcasting receiver unit 200.

In determination step S100, whether the broadcasting receiver unit 200 is powered-on or not is determined. That is, when the broadcasting function is turned on in the personal communication terminal, the broadcasting receiver unit 200 is powered-on so that it receives the second RF signal RF2 via the second antenna ANT2, and detects the signal error rate from the second RF signal RF2. Here, the second RF signal RF2 may be an RF signal included in a DVB-H broadcasting band.

In addition, the signal error rate SER can be determined according to a communication mode of the personal communication terminal adapted. The signal error rate may be for example a bit error rate (BER) or a frame error rate (FER) of the second RF signal RF2.

The setting step S200 is carried out such that, upon power-on of the broadcasting receiver unit 200, the up-to-date adjustment parameters are read-out from the memory unit 500 and are set to the phase inversion unit 400. In specific, upon power-on of the broadcasting receiver unit 200, the up-to-date adjustment parameters corresponding to the broadcasting channel selected by the broadcasting receiver unit 200 are read out from the memory unit 500 and are set to the phase inversion unit 400.

Next, the measuring step S300 is carried out such that the signal error rates are respectively measured for each broadcasting channel selected by the broadcasting receiver unit 200. That is, the signal error rates are respectively measured for each broadcasting channel selected by the broadcasting receiver unit 200, e.g., for each channel No. 6, 7, or 8. Here, the signal error rte may be a bit error rate or a frame error rate depending upon a communication mode.

Next, the re-setting step S400 is carried out such that the adjustment parameters are changed based on the signal error rate, and the changed parameters are re-set to the phase inversion unit 400. Specifically, the adjustment parameters are changed while being sorted by the respective broadcasting channels according to the respective signal error rates for each broadcasting channel, and are re-set to the phase inversion unit 400.

Next, the updating step S500 is carried out such that the changed adjustment parameters are stored in the memory unit 500 and are updated. For example, in the update step S500, the changed adjustment parameters are stored in the memory unit 500 while being sorted by the respective channels, and are updated for each channel.

The re-setting step S400 will now be explained with reference to FIG. 9.

Referring to FIG. 9, the re-setting step S400 includes the first step S410 of determining whether or not the present signal error rate measured is larger than a reference signal error rate, and if not, going to the updating step S500 without changing the adjustment parameters because of having the good transmission state for the reason that the signal error rate is smaller than the reference signal error rate.

On the contrary, in the case of the second step S420 of the re-setting step S400, if the present signal error rate is larger than the reference signal error rate, which means the bad transmission state, determination is done on whether or not the present signal error rate is larger than the previous signal error rate so as to change the adjustment parameters.

In the third step S430 of the re-setting step S400, if the present signal error rate is not larger than the previous signal error rate, adjustment is done to the phase of the phase inverter and the gain of the amplifier in the same direction as the previous adjusting direction.

In the fourth step S440 of the re-setting step S400, if the present signal error rate is larger than the previous signal error rate, adjustment is done to the phase of the phase inverter and the gain of the amplifier in opposite direction to the previous adjusting direction.

As set forth before, according to the present invention, the adjustment parameters for removing the interference noise are continuously set for each broadcasting channel so that the optimum up-to-date adjustment parameters for each broadcasting channel can be maintained, and thus upon broadcasting, the operation for removing the interference noise signal can be adjusted fast and in an optimum state.

Further, the adjustment parameters for removing the interference noise are continuously set in the memory unit for each broadcasting channel so that upon the next power-on of the system, the up-to-date adjustment parameters can be used, and thus upon broadcasting, the operation for removing the interference noise signal can be adjusted fast and in an optimum state.

According to the present invention, the function of removing interference noises is adapted to the personal communication terminal, and adjustment parameters for removing interference noises are continuously set to up-to-date adjustment parameters, so that upon activation of broadcast receiving operation, a turn-on stabilizing time of the personal communication terminal can be reduced while maintaining the broadcast receiving performance to an optimum state.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for removing interference noise in a personal communication terminal, comprising:
   a communication unit transmitting/receiving a first radio frequency signal via a first antenna;
   a broadcasting receiver unit receiving a second radio frequency signal via a second antenna and detecting a signal error rate from the second radio frequency signal;
   a signal coupler extracting the first radio frequency signal in low power from the first radio frequency signal outputted from the communication unit;
   a phase inversion unit phase-inverting an interference noise signal of the first radio frequency signal in low power extracted from the signal coupler;
   a memory unit including an adjustment table having up-to-date adjustment parameters to be set for removing the interference noise signal of the first radio frequency signal;
   a control unit, upon start of operation, setting the adjustment parameters of the memory unit to the phase inversion unit, changing the adjustment parameters based on the signal error rate from the broadcasting receiver unit, and re-setting the changed adjustment parameters to the phase inversion unit; and
   a signal combiner combining the inverted interference noise signal, from the phase inversion unit, with the second radio frequency signal, from the second antenna, thereby removing the interference noise signal of the first radio frequency signal included in the second radio frequency signal.

2. The apparatus of claim 1, wherein the control unit updates the adjustment parameters of the memory unit to adjustment parameters changed for use in next power-on.

3. The apparatus of claim 2, wherein the phase inversion unit includes:
   a filter allowing the interference noise signal of the first RF signal in low power, extracted from the signal coupler, to pass therethrough;
   a phase inverter phase-inverting the interference noise signal in low power from the filter; and
   an amplifier amplifying the interference noise signal in low power inverted from the phase inverter.

4. The apparatus of claim 2, wherein the memory unit stores therein the adjustment parameters according to broadcasting channels of the broadcasting receiver unit.

5. The apparatus of claim 4, wherein the control unit reads out, from the memory unit, the adjustment parameters corresponding to the broadcasting channel selected by the broadcasting receiver unit and sets the same to the phase inversion unit, changes the adjustment parameters according to the signal error rate corresponding to the selected channel of the broadcasting receiver unit and re-sets the same to the phase inversion unit, and updates the adjustment parameters of the memory unit for each channel to adjustment parameters changed for use in the next power-on.

6. The apparatus of claim 4, wherein the memory unit is fabricated in a single module together with the phase inversion unit and the control unit.

7. The apparatus of claim 4, wherein the memory unit is fabricated in a single module together with the broadcasting receiver unit.

8. The apparatus of claim 4, wherein the memory unit is fabricated in a single module together with the communication unit.

9. The apparatus of claim 2, wherein the signal error rate is a bit error rate of the second radio frequency signal or a frame error rate of the second radio frequency signal.

10. A method of removing interference noise in a personal communication terminal, which includes a communication unit, a broadcasting receiver unit, a phase inversion unit phase-inverting an interference noise signal extracted from a first radio frequency signal, transmitted from the communication unit, and coupling the phase-inverted signal to a second radio frequency signal input to the broadcasting receiver unit, thereby removing the interference noise signal of the first radio frequency signal included in the second radio frequency signal, and a memory unit storing therein adjustment parameters to be set for removing the interference noise signal of the first radio frequency signal, the method comprising:
   determining whether the broadcasting receiver unit is powered-on or not;
   upon power-on of the broadcasting receiver unit, reading up-to-date adjustment parameters from the memory unit and setting the same to the phase inversion unit;
   measuring a signal error rate of a broadcasting channel selected by the broadcasting receiver unit; and
   changing the adjustment parameters based on the signal error rate and re-setting the changed adjustment parameters to the phase inversion unit.

11. The method of claim 10, further comprising: storing the changed adjustment parameters in the memory unit and updating the adjustment parameters for the next use.

12. The method of claim 11, wherein the reading up-to-date adjustment parameters from the memory unit and setting the same to the phase inversion unit is carried out such that, upon power-on of the broadcasting receiver unit, the up-to-date adjustment parameters corresponding to the broadcasting channel selected by the broadcasting receiver unit are read out from the memory unit and are set to the phase inversion unit.

13. The method of claim 12, wherein the measuring a signal error rate of a broadcasting channel selected by the broadcasting receiver unit is carried out such that the signal error rates are respectively measured for each broadcasting channel selected by the broadcasting receiver unit.

14. The method of claim 13, wherein the re-setting the changed adjustment parameters to the phase inversion unit is carried out such that the adjustment parameters are changed while being sorted by the respective broadcasting channels according to the respective signal error rates for each broadcasting channel, and are re-set to the phase inversion unit.

15. The method of claim 13, wherein the updating the adjustment parameters for the next use is carried out such that the changed adjustment parameters are stored in the memory unit while being sorted by the respective channels, and are updated for each channel.

16. The method of claim 14, wherein the re-setting the changed adjustment parameters to the phase inversion unit includes:
   determining whether or not the present signal error rate measured is larger than a reference signal error rate, and if not, updating the adjustment parameters for the next use;
   if the present signal error rate is larger than the reference signal error rate, determining whether or not the present signal error rate is larger than the previous signal error rate;
   if the present signal error rate is not larger than the previous signal error rate, adjusting the phase of the phase inverter and the gain of the amplifier in the same direction as the previous adjusting direction; and
   if the present signal error rate is larger than the previous signal error rate, adjusting the phase of the phase inverter and the gain of the amplifier in opposite direction to the previous adjusting direction.

17. The method of claim 16, wherein the signal error rate is a bit error rate of the second radio frequency signal or a frame error rate of the second RF signal.

* * * * *